(12) United States Patent
Kang et al.

(10) Patent No.: US 10,352,290 B2
(45) Date of Patent: Jul. 16, 2019

(54) METHOD AND APPARATUS FOR WAVE ENERGY CONVERSION

(71) Applicant: The Texas A&M University System, College Station, TX (US)

(72) Inventors: Heonyong Kang, Houston, TX (US); Moohyun Kim, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 15/896,335

(22) Filed: Feb. 14, 2018

(65) Prior Publication Data

US 2018/0230961 A1  Aug. 16, 2018

Related U.S. Application Data

(60) Provisional application No. 62/458,884, filed on Feb. 14, 2017.

(51) Int. Cl.
| | |
|---|---|
| *F03B 11/06* | (2006.01) |
| *F03B 13/18* | (2006.01) |
| *F03B 13/20* | (2006.01) |
| *F03B 15/00* | (2006.01) |

(52) U.S. Cl.
CPC ........ *F03B 13/1845* (2013.01); *F03B 11/063* (2013.01); *F03B 13/20* (2013.01); *F03B 15/00* (2013.01); *F05B 2220/707* (2013.01); *F05B 2240/40* (2013.01); *F05B 2250/11* (2013.01); *F05B 2250/132* (2013.01); *F05B 2250/231* (2013.01); *F05B 2270/20* (2013.01); *Y02E 10/38* (2013.01)

(58) Field of Classification Search
USPC ................ 290/42, 53; 65/500; 417/330–339; 60/500
See application file for complete search history.

(56) References Cited

U.S. PATENT DOCUMENTS

| | | | | |
|---|---|---|---|---|
| 1,018,678 A | * | 2/1912 | Nelson .................... | F02B 63/04 290/4 D |
| 1,078,323 A | * | 11/1913 | Trull ....................... | F03B 13/20 417/332 |

(Continued)

OTHER PUBLICATIONS

Chen, Z.X., et al., A Review of Offshore Wave Energy Extraction System. Advances in Mechanical Engineering, 2013 [9 pages].

(Continued)

*Primary Examiner* — Pedro J Cuevas
(74) *Attorney, Agent, or Firm* — Winstead PC

(57) ABSTRACT

A wave energy conversion cylinder includes an outer cylinder and a center rod disposed along an axis of the outer cylinder. A plurality of electrically-conductive windings are disposed about an inner circumference of the outer cylinder. A magnet is slidably disposed on the center rod. A buoyancy cylinder is disposed outwardly of the outer cylinder. A first moveable ring weight may be slidably disposed along the axis of the center rod and a second moveable ring weight may be slidably disposed along the axis of the center rod. The first moveable ring weight and the second moveable ring weight facilitate control to tune a mass moment of inertia of the wave energy conversion cylinder.

19 Claims, 5 Drawing Sheets

(56) References Cited

U.S. PATENT DOCUMENTS

| | | | | |
|---|---|---|---|---|
| 1,502,511 | A * | 7/1924 | Marvin | F03B 13/186 60/501 |
| 3,362,336 | A * | 1/1968 | Kafka | B63B 13/00 114/183 R |
| 3,546,473 | A * | 12/1970 | Rich | F03B 13/1845 290/42 |
| 3,598,505 | A * | 8/1971 | Greene | F04B 43/086 417/220 |
| 3,696,251 | A * | 10/1972 | Last | F03B 13/1855 290/53 |
| 3,758,788 | A * | 9/1973 | Richeson | F03B 13/20 290/1 R |
| 3,783,302 | A * | 1/1974 | Woodbridge | F03B 13/18 290/42 |
| 3,961,863 | A * | 6/1976 | Hooper, III | F03B 13/188 417/334 |
| 4,077,213 | A * | 3/1978 | Hagen | F03B 13/20 417/331 |
| 4,098,084 | A * | 7/1978 | Cockerell | F03B 13/20 417/332 |
| 4,105,368 | A * | 8/1978 | Waters | F03B 13/1815 417/331 |
| 4,110,628 | A * | 8/1978 | Paull | E21B 43/01 114/264 |
| 4,118,932 | A * | 10/1978 | Sivill | F03B 13/20 417/332 |
| 4,210,821 | A * | 7/1980 | Cockerell | F03B 13/20 290/53 |
| 4,239,976 | A * | 12/1980 | Collard | F03B 17/063 290/42 |
| 4,260,901 | A * | 4/1981 | Woodbridge | F03B 13/1855 290/42 |
| 4,313,716 | A * | 2/1982 | Jones | F03B 13/20 417/331 |
| 4,341,074 | A * | 7/1982 | French | F03B 13/20 417/333 |
| RE31,111 | E * | 12/1982 | Hagen | F03B 13/20 417/331 |
| 4,392,349 | A * | 7/1983 | Hagen | F03B 13/20 60/500 |
| 4,421,461 | A * | 12/1983 | Hicks | B01D 61/10 417/53 |
| 4,480,966 | A * | 11/1984 | Smith | F03B 13/1815 417/332 |
| 4,539,485 | A * | 9/1985 | Neuenschwander | F03B 13/187 290/53 |
| 4,631,921 | A * | 12/1986 | Linderfelt | F03B 13/1845 290/53 |
| 4,672,222 | A * | 6/1987 | Ames | F03B 13/1895 290/53 |
| 4,684,815 | A * | 8/1987 | Gargos | F03B 13/20 290/42 |
| 4,686,377 | A * | 8/1987 | Gargos | F03B 13/20 290/42 |
| 4,754,157 | A * | 6/1988 | Windle | F03B 13/189 290/42 |
| 4,851,704 | A * | 7/1989 | Rubi | F03B 13/20 290/53 |
| 5,132,550 | A * | 7/1992 | McCabe | B01D 61/10 290/53 |
| 5,347,186 | A * | 9/1994 | Konotchick | H02K 7/1876 310/17 |
| 5,696,413 | A * | 12/1997 | Woodbridge | F03B 13/1855 290/53 |
| 6,109,029 | A * | 8/2000 | Vowles | B01D 61/10 270/42 |
| 6,229,225 | B1 * | 5/2001 | Carroll | F03B 13/10 290/42 |
| 6,476,511 | B1 * | 11/2002 | Yemm | F03B 13/20 290/42 |
| 6,644,027 | B1 * | 11/2003 | Kelly | F03B 13/1845 60/498 |
| 6,861,772 | B2 * | 3/2005 | Cheung | H02K 35/02 290/1 R |
| 7,045,912 | B2 * | 5/2006 | Leijon | F03B 13/1885 290/42 |
| 7,140,180 | B2 * | 11/2006 | Gerber | F03B 13/1845 60/496 |
| 7,141,888 | B2 * | 11/2006 | Sabol | B60L 7/003 290/53 |
| 7,164,212 | B2 * | 1/2007 | Leijon | F03B 13/1885 290/42 |
| 7,168,532 | B2 * | 1/2007 | Stewart | B60L 7/003 188/161 |
| 7,315,092 | B2 * | 1/2008 | Cook | F03B 13/20 290/42 |
| 7,323,790 | B2 * | 1/2008 | Taylor | F03B 13/1895 290/42 |
| 7,362,003 | B2 * | 4/2008 | Stewart | F03B 13/1845 290/42 |
| 7,397,152 | B2 * | 7/2008 | Stewart | H02K 7/1876 310/12.22 |
| 7,420,287 | B2 * | 9/2008 | Smushkovich | F03B 13/1845 290/42 |
| 7,436,082 | B2 * | 10/2008 | Ruse | F03B 13/1875 290/42 |
| 7,443,045 | B2 * | 10/2008 | Yemm | F03B 13/20 290/42 |
| 7,453,165 | B2 * | 11/2008 | Hench | F03B 13/20 290/42 |
| 7,476,137 | B2 * | 1/2009 | Stewart | F03B 13/1815 290/42 |
| 7,554,215 | B1 * | 6/2009 | Caragine | F03B 17/00 290/42 |
| 7,629,704 | B2 * | 12/2009 | Hench | F03B 13/20 290/42 |
| 7,632,041 | B2 * | 12/2009 | Jean | E02B 9/08 405/76 |
| 7,683,507 | B2 * | 3/2010 | Kelly | H02K 7/1876 310/12.12 |
| 7,737,569 | B2 * | 6/2010 | Hench | F03B 13/20 290/42 |
| 7,768,144 | B2 * | 8/2010 | North | F03B 13/1805 290/42 |
| 7,816,797 | B2 * | 10/2010 | Nair | H01L 41/125 290/42 |
| 7,964,977 | B2 * | 6/2011 | Nair | H01L 41/125 290/42 |
| 7,989,975 | B2 * | 8/2011 | Clement | F03B 13/20 290/53 |
| 8,004,104 | B2 * | 8/2011 | Hench | F03B 13/20 114/230.27 |
| 8,008,792 | B2 * | 8/2011 | Gray | F03B 13/20 290/42 |
| 8,049,356 | B2 * | 11/2011 | Chervin | F03B 13/20 290/53 |
| 8,115,350 | B2 * | 2/2012 | Yoshida | H02K 35/02 29/596 |
| 8,193,651 | B2 * | 6/2012 | Lightfoot | F03B 13/20 290/42 |
| 8,212,411 | B2 * | 7/2012 | Thorburn | F03B 13/18 307/84 |
| 8,269,365 | B2 * | 9/2012 | Clement | F03B 13/20 290/1 R |
| 8,304,925 | B2 * | 11/2012 | Yang | F03B 13/20 290/42 |
| 8,319,366 | B2 * | 11/2012 | Andujar | F03B 13/182 290/53 |
| 8,334,611 | B2 * | 12/2012 | Shreider | F03B 11/08 290/42 |
| 8,358,025 | B2 * | 1/2013 | Hogmoe | F03B 13/1815 290/42 |
| 8,519,557 | B2 * | 8/2013 | Beane | F03B 13/20 290/53 |
| 8,614,520 | B2 * | 12/2013 | Rohrer | F03B 13/182 290/42 |

(56) References Cited

U.S. PATENT DOCUMENTS

| | | | | |
|---|---|---|---|---|
| 8,629,572 B1* | 1/2014 | Phillips | F03B 13/16 | 290/53 |
| 8,671,675 B2* | 3/2014 | Cuong | F03B 13/20 | 290/42 |
| 8,698,328 B2* | 4/2014 | Nair | F03B 13/1885 | 290/1 R |
| 8,701,403 B2* | 4/2014 | Beane | F03B 13/20 | 60/496 |
| 8,723,353 B1* | 5/2014 | Franklin | F03B 13/20 | 290/42 |
| 8,766,470 B2* | 7/2014 | Beane | F03B 13/20 | 290/53 |
| 8,778,176 B2* | 7/2014 | Murtha | B01D 24/14 | 210/170.11 |
| 8,784,653 B2* | 7/2014 | Murtha | B01D 24/042 | 210/170.11 |
| 8,803,346 B2* | 8/2014 | Pitre | F03B 13/186 | 290/42 |
| 8,866,321 B2* | 10/2014 | McCormick | F03B 13/20 | 290/42 |
| 8,878,381 B2* | 11/2014 | Henry | F03B 13/264 | 290/53 |
| 8,946,919 B2* | 2/2015 | Phillips | F03B 13/16 | 290/53 |
| 8,946,920 B2* | 2/2015 | Phillips | F03B 13/16 | 290/53 |
| 8,952,560 B2* | 2/2015 | Phillips | F03B 13/16 | 290/53 |
| 8,963,358 B2* | 2/2015 | Phillips | F03B 13/16 | 290/53 |
| 9,016,055 B2* | 4/2015 | Dragic | F03B 13/1855 | 290/42 |
| 9,018,779 B2* | 4/2015 | Yemm | F03B 13/20 | 290/42 |
| 9,115,689 B2* | 8/2015 | Malligere | F03B 13/22 | |
| 9,127,640 B2* | 9/2015 | Rohrer | F03B 13/182 | |
| 9,257,891 B2* | 2/2016 | Kawarai | H02K 35/02 | |
| 9,334,860 B2* | 5/2016 | Knowles, Jr. | F04B 5/02 | |
| 9,371,816 B2* | 6/2016 | Cho | F03B 13/1855 | |
| 9,435,315 B2* | 9/2016 | Kalnay | F03B 13/1815 | |
| 9,476,400 B2* | 10/2016 | Phillips | F03B 13/16 | |
| 9,523,346 B2* | 12/2016 | Findlay | F03B 13/1815 | |
| 9,581,130 B2* | 2/2017 | Zakheos | F03B 13/188 | |
| 9,587,635 B2* | 3/2017 | Knowles, Jr. | F04B 5/02 | |
| 9,617,972 B1* | 4/2017 | Skaf | F03B 13/20 | |
| 9,624,900 B2* | 4/2017 | Phillips | F03B 13/20 | |
| 9,644,601 B2* | 5/2017 | Phillips | F03B 13/16 | |
| 9,702,334 B2* | 7/2017 | Murtha, Jr. | F03B 13/20 | |
| 9,845,800 B2* | 12/2017 | Knowles, Jr. | F04B 5/02 | |
| 9,976,535 B2* | 5/2018 | Beane | F03B 13/182 | |
| 10,011,910 B2* | 7/2018 | Phillips | H02K 7/1853 | |
| 10,029,927 B2* | 7/2018 | Murtha | B01D 24/042 | |
| 10,030,645 B2* | 7/2018 | Knowles | F04B 5/02 | |
| 10,047,717 B1* | 8/2018 | Phillips | F03B 13/20 | |
| 2004/0061338 A1* | 4/2004 | Woodbridge | F03B 13/1845 | 290/53 |
| 2004/0251692 A1* | 12/2004 | Leijon | F03B 13/1885 | 290/42 |
| 2005/0121915 A1* | 6/2005 | Leijon | F03B 13/1885 | 290/42 |
| 2006/0208839 A1* | 9/2006 | Taylor | F03B 13/1895 | 335/205 |
| 2008/0084121 A1* | 4/2008 | Kelly | H02K 7/1876 | 310/12.12 |
| 2008/0093858 A1* | 4/2008 | Hench | F03B 13/20 | 290/53 |
| 2008/0265582 A1* | 10/2008 | Hench | F03B 13/20 | 290/53 |
| 2008/0309088 A1* | 12/2008 | Agamloh | F03B 13/1845 | 290/53 |
| 2009/0121486 A1* | 5/2009 | Ganley | F03B 13/262 | 290/53 |
| 2009/0127856 A1* | 5/2009 | Hench | F03B 13/20 | 290/42 |
| 2009/0196693 A1* | 8/2009 | Kelly | F03B 13/18 | 405/195.1 |
| 2010/0038913 A1* | 2/2010 | Svelund | F03B 13/1815 | 290/53 |
| 2010/0084928 A1* | 4/2010 | Yoshida | H02K 35/02 | 310/15 |
| 2010/0117367 A1* | 5/2010 | Muller | H02K 3/47 | 290/53 |
| 2010/0133843 A1* | 6/2010 | Nair | H01L 41/125 | 290/53 |
| 2010/0140945 A1* | 6/2010 | Andujar | F03B 13/182 | 290/53 |
| 2010/0228401 A1* | 9/2010 | Hench | F03B 13/20 | 700/287 |
| 2011/0031751 A1* | 2/2011 | Yang | F03B 13/20 | 290/53 |
| 2011/0057448 A1* | 3/2011 | Page | F03B 13/20 | 290/53 |
| 2011/0061377 A1* | 3/2011 | Preftitsis | F03B 13/20 | 60/500 |
| 2011/0062713 A1* | 3/2011 | Ardoise | F03B 13/1865 | 290/53 |
| 2011/0089697 A1* | 4/2011 | Nair | H01L 41/125 | 290/53 |
| 2011/0133463 A1* | 6/2011 | Nair | H01L 41/125 | 290/53 |
| 2011/0308244 A1* | 12/2011 | Findlay | F03B 13/1815 | 60/500 |
| 2012/0194008 A1* | 8/2012 | Iijima | H02K 35/02 | 310/30 |
| 2013/0049369 A1* | 2/2013 | Andujar | F03B 13/182 | 290/53 |
| 2013/0221768 A1* | 8/2013 | Kawarai | H02K 35/02 | 310/30 |
| 2014/0117673 A1* | 5/2014 | Phillips | F03B 13/16 | 290/53 |
| 2014/0117674 A1* | 5/2014 | Phillips | F03B 13/16 | 290/53 |
| 2014/0313001 A1* | 10/2014 | Phillips | F03B 13/16 | 335/306 |
| 2014/0339928 A1* | 11/2014 | Phillips | F03B 13/16 | 310/30 |
| 2015/0145258 A1* | 5/2015 | Phillips | F03B 13/16 | 290/53 |
| 2016/0010619 A1* | 1/2016 | Phillips | F03B 13/16 | 290/53 |
| 2016/0252071 A1* | 9/2016 | Phillips | F03B 13/20 | 290/50 |
| 2017/0198401 A1* | 7/2017 | Phillips | H02K 7/1853 | |

OTHER PUBLICATIONS

Falcao, A.F.D., Wave Energy Utilization: A review of the technologies. Renewable & Sustainable Energy Reviews, 2010, 14(3): pp. 899-918 [20 pages].

Drew, B., et al., A review of wave energy converter technology. Proceedings of the Institution of Mechanical Engineers Part A—Journal of Power and Energy, 2009. 232 (A8): pp. 887-902 [16 pages].

Falnes, J., A review of wave-energy extraction. Marine Structures, 2007 20(4): pp. 185-201 [17 pages].

Bull, D. et al., Technological cost-reduction pathways for point absorber wave energy converters in the marine hydrokinetic environment. Sandia National Laboratories, 2013.

Yu, Y., et al., Experimental Wave Tank Test for Reference Mondel 3 Floating-Point Absorber Wave Energy Converter Project. 2015.

* cited by examiner

METHOD AND APPARATUS FOR WAVE ENERGY CONVERSION

CROSS-REFERENCE TO RELATED APPLICATIONS

This application claims priority to, and incorporates by reference the entire disclosure of, U.S. Provisional Patent Application No. 62/458,884, filed on Feb. 14, 2017.

TECHNICAL FIELD

The present disclosure relates generally to power conversion and more particularly, but not by way of limitation, to power conversion utilizing a surface-riding wave energy converter.

BACKGROUND

This section provides background information to facilitate a better understanding of the various aspects of the disclosure. It should be understood that the statements in this section of this document are to be read in this light, and not as admissions of prior art.

As worldwide energy demands increase, the need for cost-efficient, renewable sources of energy also increases. Such need has given rise to the development of solar, wind, geothermal, and other renewable sources of energy. One area of particular interest is the use of ocean wave energy for power conversion. Previous developments in wave-energy power conversion have utilized devices such as subsea turbines and large-draft devices. These devices are often plagued by high installation and maintenance costs thereby rendering them unsuitable as long-term sources of electrical power. Thus a need exists for a costs-efficient wave-energy conversion device.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter.

In one aspect, the present disclosure relates to a wave energy conversion cylinder. The wave energy conversion cylinder includes an outer cylinder and a center rod disposed along an axis of the outer cylinder. A plurality of electrically-conductive windings are disposed about an inner circumference of the outer cylinder. A magnet is slidably disposed on the center rod and a buoyancy shell is disposed outwardly of the outer cylinder.

In another aspect, embodiments of the present disclosure relate to a wave-energy conversion farm. The wave energy conversion farm includes at least one wave energy conversion device. The at least one wave energy conversion device includes at least one wave energy conversion cylinder. The at least one wave energy conversion cylinder includes an outer cylinder and a center rod disposed along an axis of the outer cylinder. A plurality of electrically-conductive coils are disposed about an inner circumference of the outer cylinder. A magnet is slidably disposed on the center rod. A buoyancy shell is disposed outwardly of the outer cylinder. An umbilical is electrically coupled to the plurality of electrically-conductive windings and electrically coupled to a power grid.

In another aspect, the present disclosure relates to a method of converting wave energy. The method includes providing a wave energy conversion cylinder. The wave energy conversion cylinder includes an outer cylinder and a center rod disposed along an axis of the outer cylinder. A plurality of electrically-conductive coils are disposed about an inner circumference of the outer cylinder. A magnet is slidably disposed on the center rod and a buoyancy cylinder is disposed outwardly of the outer cylinder. The method may also include connecting the plurality of electrically-conductive windings to a power grid, subjecting the wave energy conversion cylinder to wave action on a body of water, and inducing an electrical current in the plurality of electrically-conductive windings responsive to movement of the magnet.

BRIEF DESCRIPTION OF THE DRAWINGS

The disclosure is best understood from the following detailed description when read with the accompanying figures. It is emphasized that, in accordance with standard practice in the industry, various figures are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
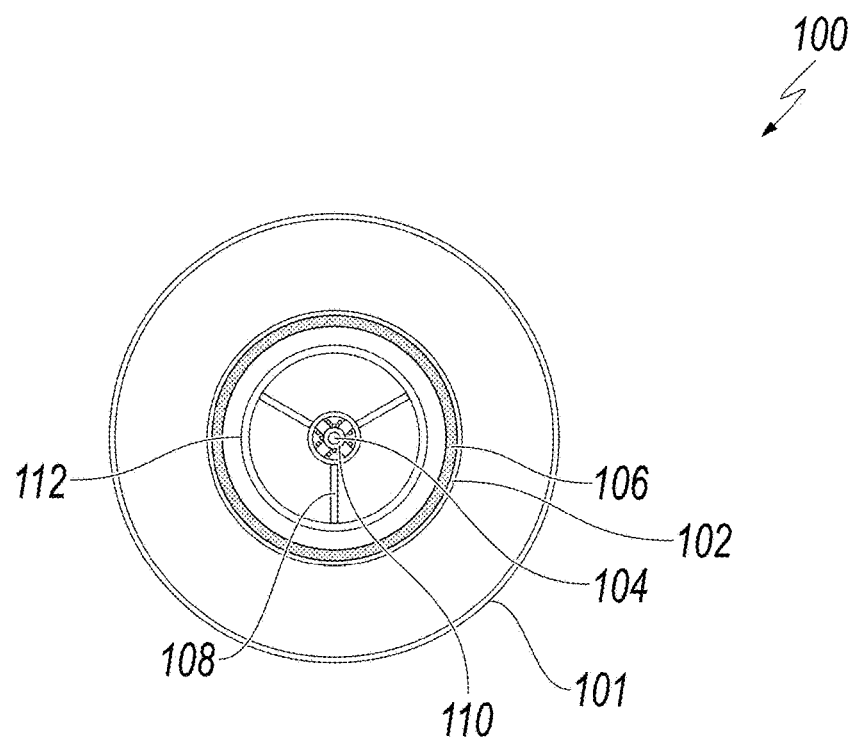
FIG. 1 is a lateral cross-sectional view of a wave energy conversion cylinder in accordance with an exemplary embodiment.

FIG. 1 is a lateral cross sectional view of a wave energy conversion cylinder 100. The wave energy conversion cylinder 100 includes an outer shell 102 and a center rod 104 disposed approximately along a length of a long axis of the outer shell 102. A buoyancy shell 101 is disposed around the outer shell. In a typical embodiment, the buoyancy shell creates an air gap between the outer shell 102 and the buoyancy shell 101 so as to increase the buoyancy of the wave energy conversion cylinder 100. In various embodiments, a buoyancy foam can also be utilized as an alternative to an air-filled buoyancy shell. A plurality of electrically conductive windings 106 are formed about an inner circumference of the outer shell 102. In a typical embodiment, the plurality of electrically conductive windings 106 are formed from a metallic material such as, for example, copper, aluminum, or steel; however, in other embodiments, any electrically conductive material could be utilized as dictated by design requirements. In a typical embodiment, the wave energy conversion cylinder 100 has a length of approximately 3.5 meters to approximately 10 meters; however, the length of the wave energy conversion cylinder 100 can be optimized for specific sea conditions.

Still referring to FIG. 1, a bracket 108 is disposed on the center rod 104 and is movable along the center rod 104 from one end to the other. A plurality of bearing devices 110 are disposed between the bracket 108 and the center rod 104 so as to reduce friction between the bracket 108 and the center rod 104. The bearing devices 110 are illustrated in FIG. 1 as ball rollers; however, in other embodiments, the bearing devices 110 could be any type of bearing as dictated by design requirements. A magnet 112 is disposed on an outer surface of the bracket 108 such that the plurality of electrically conductive windings 106 are exposed to a magnetic field produced by the magnet 112. In a typical embodiment, the magnet 112 is a permanent magnet; however, in other embodiments, various types of magnets such as, for example electromagnets could be utilized as dictated by design requirements.

Figure 2:
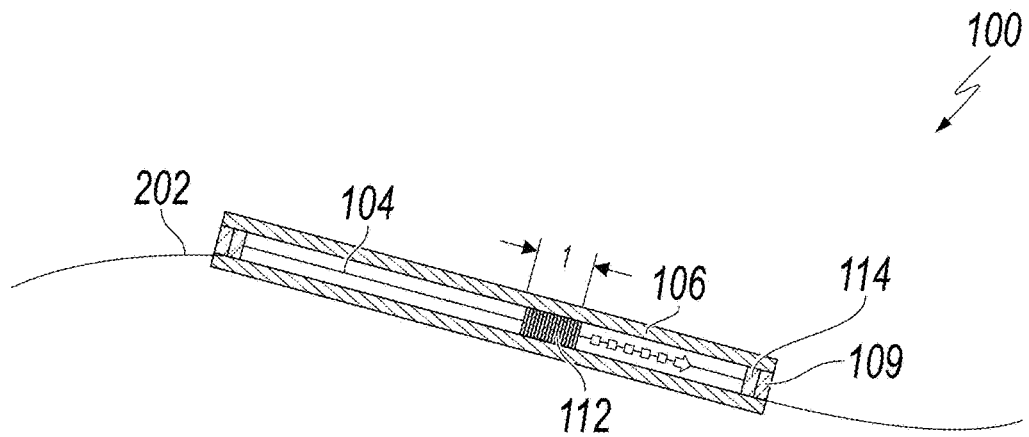
FIG. 2 is a longitudinal sectional view of a wave energy conversion cylinder in accordance with an exemplary embodiment.

FIG. 2 is a longitudinal cross sectional view of the wave energy conversion cylinder 100. The plurality of electrically conductive windings 106 are coupled to a cable box 109. In a typical embodiment, the cable box 109 facilitates coupling of the wave energy conversion cylinder 100 to an electrical grid. In other embodiments, the cable box 109 can be an intermediate connection between the wave energy conversion cylinder 100 and the electrical grid. An absorber block 114 is disposed at each end of the wave energy conversion cylinder 100. In a typical embodiment, the absorber block 114 is constructed of, for example, rubber or a spring and serves to dampen motion of the bracket 108 and the magnet 112 when the bracket 108 and the magnet 112 reach an end of the wave energy conversion cylinder 100. The wave energy conversion cylinder 100 floats with low draft on a surface of water 202. In a typical embodiment, the wave energy conversion cylinder 100 has a draft of approximately 70% of a radius of the wave energy conversion cylinder 100. Such low draft exhibits low environmental loads and reduces a structural strength requirement of the wave energy conversion cylinder 100.

Still referring to FIG. 2, wave action of the water 202 causes a height of the water 202 to periodically change thereby causing alternating inclination of the wave energy conversion cylinder 100. As the inclination of the wave energy conversion cylinder 100 changes, the bracket 108 and the magnet 112 move along the center rod 104 under the force of gravity. As the magnet 112 travels the length of the center rod 104, the magnetic field produced by the magnet 112 induces an electric current in the plurality of electrically conductive windings 106. An inclination angle produced by wave elevations is relatively invariant across sea states from mild to severe. Thus, the wave energy conversion cylinder 100 has an extended operating window from mild to severe sea states. Inclinations as low as approximately 1 degree can induce motion in the magnet 112 relative to the plurality of electrically conductive windings 106 and generate an electrical current. The light structure of wave energy conversion cylinder 100 allows the wave energy conversion cylinder 100 to operate throughout a full 360 degrees of pitch rotation in extreme survival sea states. As the sliding acceleration of the magnet 112 is induced by gravity, the relative velocity of the magnet 112, which is proportional to motion-induced voltage, can be in larger scale than inertia-driven acceleration of other existing devices. In a typical embodiment the wave energy conversion cylinder 100 exhibits power conversion that is approximately 5 to approximately 10 times greater than acceleration due to inertia and, along with invariant wave inclination, makes the wave energy conversion cylinder highly efficient in short-crested seas.

Figure 3:
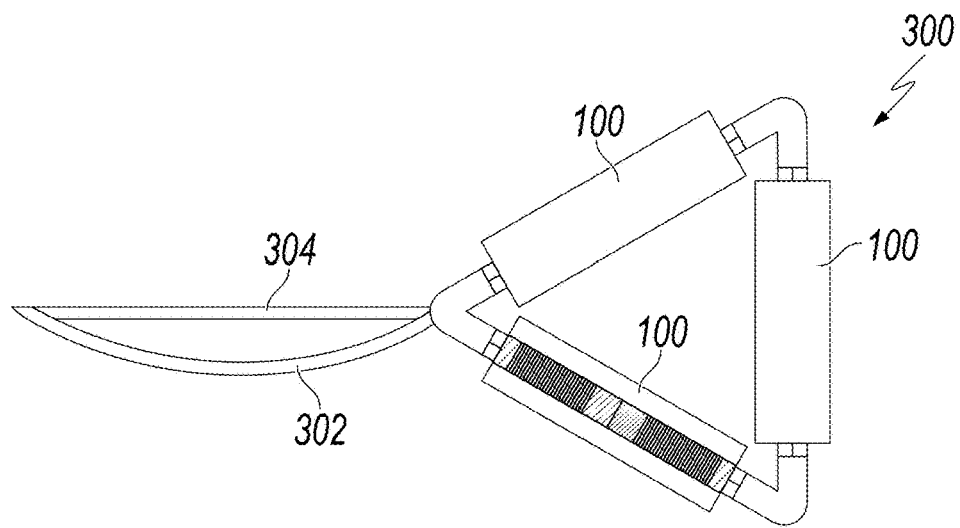
FIG. 3 is a top view of a delta surface riding wave energy converter in accordance with an exemplary embodiment.

FIG. 3 is a top view of a surface riding wave energy converter 300. The surface riding wave energy converter 300 includes three wave energy conversion cylinders 100 arranged in a generally triangular configuration. A power umbilical 302 is connected to the wave energy conversion cylinders 100 so as to provide a connection for the surface riding wave energy converter 300 to a power grid or to an adjacent surface riding wave energy converter. In a typical embodiment, a tension element such as, for example, a hawser 304 is disposed with the power umbilical 302. The hawser 304 bears tension loads resulting from wave action and prevents tension from being applied to the power umbilical 302. In a typical embodiment, triangular arrangement of the wave energy conversion cylinders 100 facilitates alignment of the surface riding wave energy converter 300 with a direction of wave travel. Although the surface riding wave energy converter 300 is shown by way of example as having a triangular shape, the surface riding wave energy converter 300 may, in other embodiments, have a hexagonal, rectangular, or any other appropriate shape.

Figure 4:
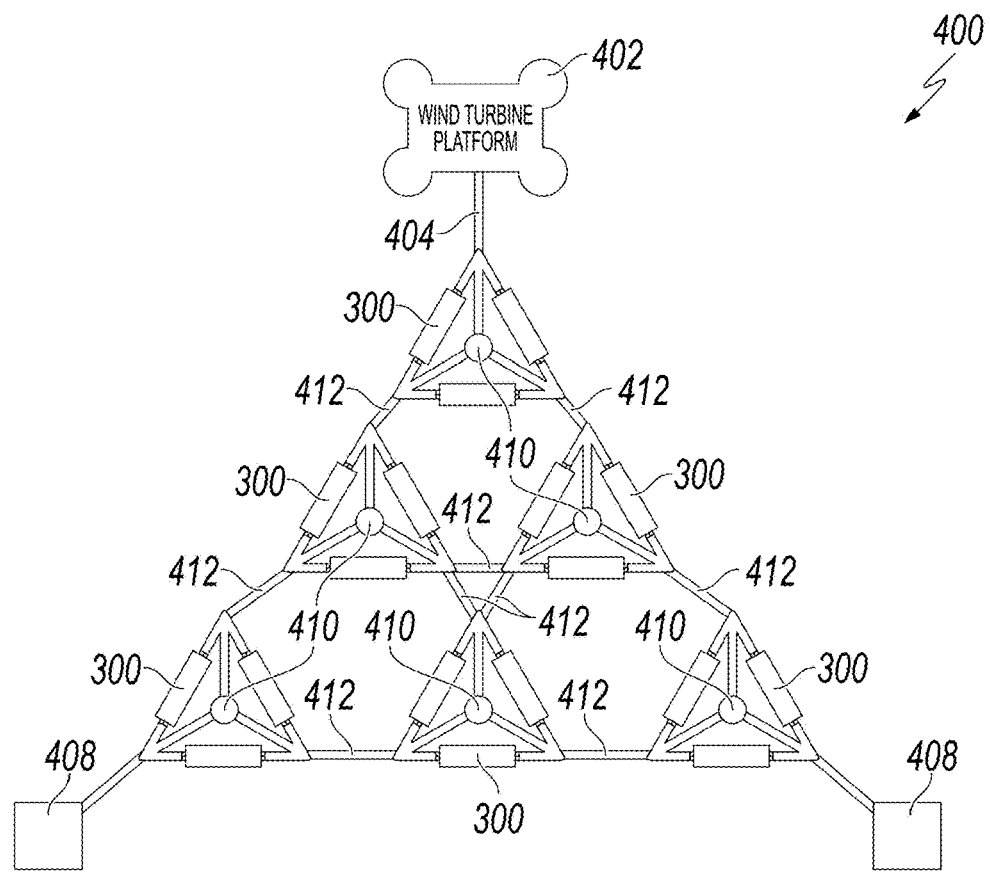
FIG. 4 is a top view of a delta surface riding wave energy conversion farm in accordance with an exemplary embodiment.

FIG. 4 is a top view of a surface riding wave energy conversion farm 400. The surface riding wave energy conversion farm 400 includes a plurality of surface riding wave energy converters 300. In a typical embodiment, the plurality of surface riding wave energy converters 300 are arranged in a triangular or "delta" configuration; however, in other embodiments, the surface riding wave energy converters 300 may be arranged in any pattern as dictated by design requirements. The surface riding wave energy conversion farm 400 is secured to, for example, a wind turbine platform 402 via a mooring 404. In various embodiments, the wind turbine platform 402 can be a stand-alone platform or coupled to an existing wind farm. In other embodiments, the wind turbine platform 402 may be omitted. The surface riding wave energy conversion farm 400 is also connected to at least one concrete weight 408 or anchor. In a typical embodiment, connection of the surface riding wave energy conversion farm 400 to the mooring 404 and the at least one concrete weight 408 or anchor prevents drifting of the surface riding wave energy conversion farm 400 due to wave action. The surface riding wave energy converters 300 are arranged to facilitate accessibility for maintenance and repair. In a typical embodiment, the wave energy conversion farm 400 rides waves with negligible radiation waves and no significant disturbance to wave fields.

Still referring to FIG. 4, an umbilical connection point 410 is associated with each surface riding wave energy converter 300. As previously noted, the umbilical connection point 410 facilitates connection of the surface riding wave energy conversion farm 400 to, for example, a power grid. Additionally, the surface riding wave energy converters 300 are connected to each other via tethers 412. The tethers 412 prevent the surface riding wave energy converters 300 from drifting apart due to wave action.

Figure 5:
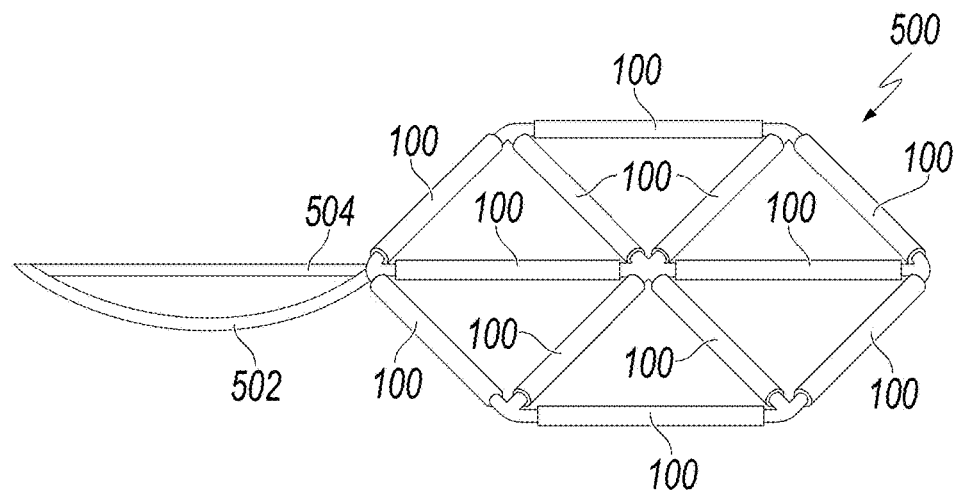
FIG. 5 is a top view of a hexagonal surface riding wave energy converter in accordance with an exemplary embodiment.

FIG. 5 is a top view of a hexagonal surface riding wave energy converter 500. The surface riding wave energy converter 500 includes twelve wave energy conversion cylinders 100 arranged in a generally hexagonal configuration. A power umbilical 502 is connected to the wave energy conversion cylinders 100 so as to provide a connection for the surface riding wave energy converter 500 to a power grid or to an adjacent surface riding wave energy converter. In a typical embodiment, a tension element such as, for example, a hawser 504 is disposed with the power umbilical 502. The hawser 504 bears tension loads resulting from wave action and prevents tension from being applied to the power umbilical 502. In a typical embodiment, hexagonal arrangement of the wave energy conversion cylinders 100 facilitates alignment of the surface riding wave energy converter 500 with a direction of wave travel. Although the surface riding wave energy converter 500 is shown by way of example as having a hexagonal shape, the surface riding wave energy converter 500 may, in other embodiments, have a triangular or rectangular shape.

Figure 6:
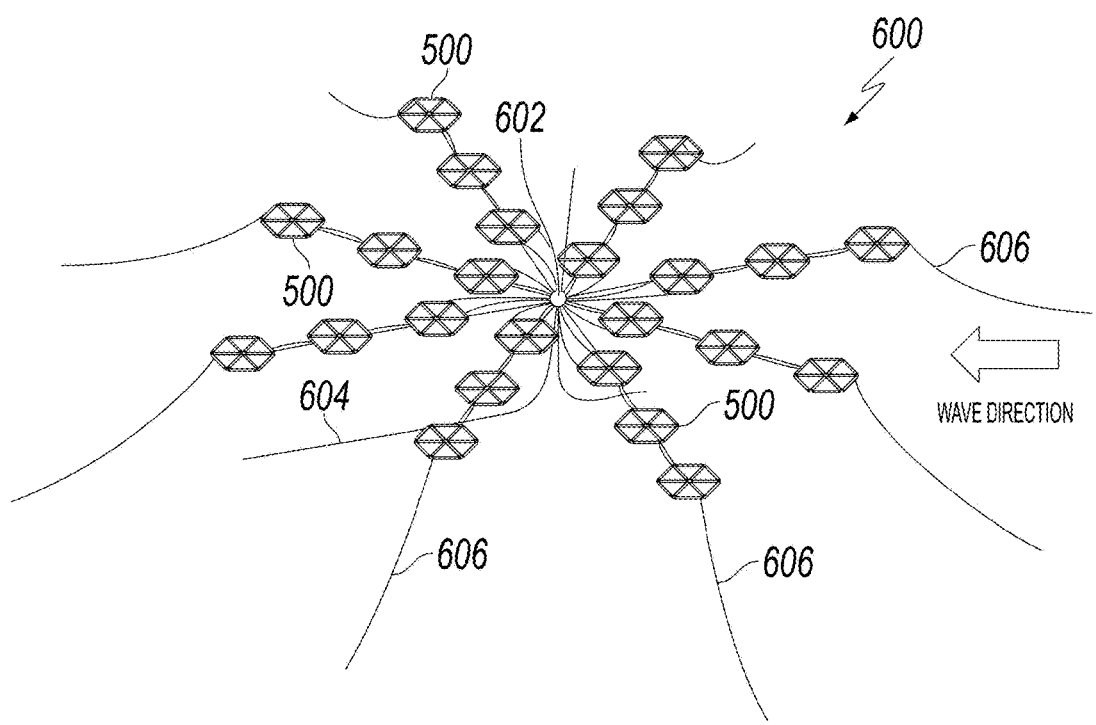
FIG. 6 is a top view of a surface riding wave energy conversion farm in accordance with an exemplary embodiment.

FIG. 6 is a top view of a surface riding wave energy conversion farm 600. The surface riding wave energy conversion farm 600 includes a plurality of surface riding wave energy converters 500. The surface riding wave energy converters 500 are arranged such that plurality of surface riding wave energy converters extend radially from a central buoy 602. The surface riding wave energy converters 500 are connected to each other via the power umbilical 502 and the hawser 504 and are ultimately connected to the central buoy 602. A central power umbilical 604 is connected to the central buoy 602 and provides connection of the surface riding wave energy conversion farm 600 to a power grid. Mooring lines 606 are connected to various ones of the surface riding wave energy converters 500. In a typical embodiment, the mooring lines 606 prevent drifting of the surface riding wave energy conversion farm 600 due to wave action. The surface riding wave energy converters 500 are arranged to facilitate accessibility for maintenance and repair. In a typical embodiment, the wave energy conversion farm 600 rides waves with negligible radiation waves and no significant disturbance to wave fields.

Figure 7:
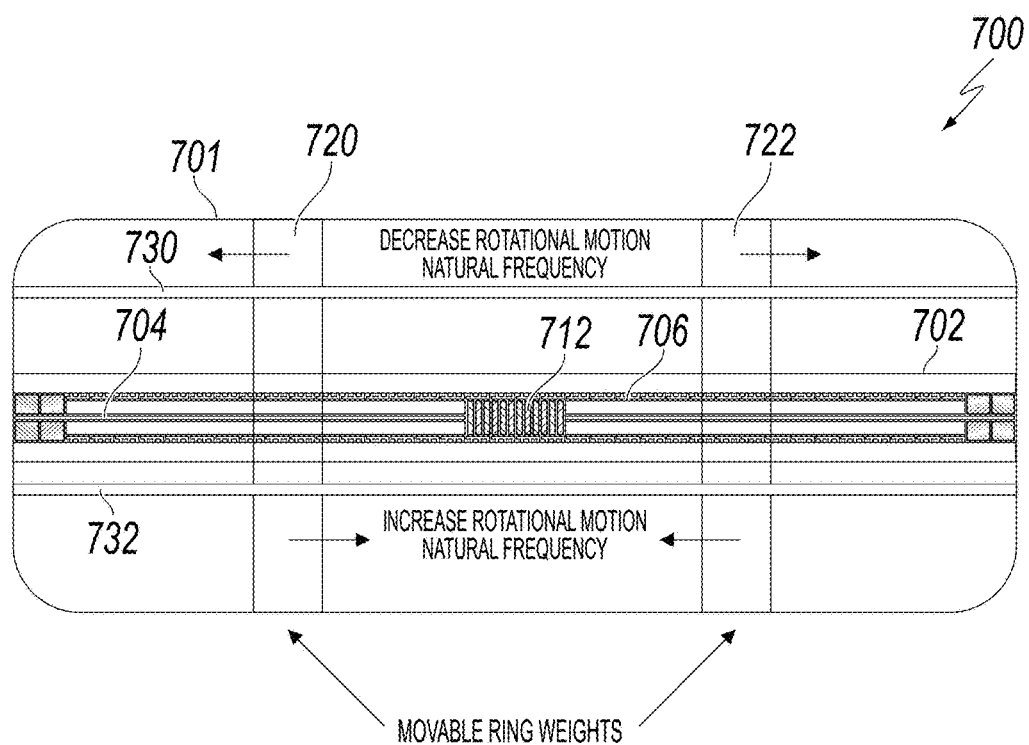
FIG. 7 is a plan view of a tunable wave energy conversion cylinder in accordance with an exemplary embodiment.

FIG. 7 is a plan view of a tunable wave energy conversion cylinder 700. The tunable wave energy conversion cylinder 700 includes an outer shell 702 and a center rod 704 disposed approximately along a length of a long axis of the outer shell 702. A buoyancy shell 701 is disposed around the outer shell. In a typical embodiment, the buoyancy shell creates an air gap between the outer shell 702 and the buoyancy shell 701 so as to increase the buoyancy of the wave energy conversion cylinder. A plurality of electrically conductive windings 706 are formed about an inner circumference of the outer shell 702. In a typical embodiment, the plurality of electrically conductive windings 706 are formed from an metallic material such as, for example, copper, aluminum, or steel; however, in other embodiments, any electrically conductive material could be utilized as dictated by design requirements. A magnet 712 is disposed on the center rod 704 such that the plurality of electrically conductive windings 706 are magnetically exposed to the magnet 712. In various embodiments, the magnet 712 may be disposed on a bracket of the type described in FIG. 1. In a typical embodiment, the magnet 712 is a permanent magnet; however, in other embodiments, various types of magnets such as, for example electromagnets could be utilized as dictated by design requirements.

Still referring to FIG. 7, a first movable ring weight 720 and a second movable ring weight 722 are disposed between the outer shell 702 and the buoyancy shell 701. In a typical embodiment, the first movable ring weight 720 and the second movable ring weight 722 are capable of longitudinal movement along an axis of the wave energy conversion cylinder 700. In a typical embodiment, movement of the first movable ring weight 720 and the second movable ring weight 722 allows the wave energy conversion cylinder 700 to have active control to tune a mass moment of inertia of the wave energy conversion cylinder 700 for tilted angle motion. By utilizing a frequency measuring device, excitation frequency can be measured and the first movable ring weight 720 and the second movable ring weight 722 are adjusted to bring the natural frequency close to the excitation frequency. Such a matching of the natural frequency with the excitation frequency results in resonance that amplifies the sliding motion and power output of the wave energy conversion cylinder 700. In a typical embodiment movement of the first movable ring weight 720 and the second movable ring weight 722 is actively controlled. An upper guide rod 703 and a lower guide rod 732 are installed through the first movable ring weight 720 and the second movable ring weight 722. An interface of at least one of the upper guide rod 730 and the lower guide rod 732 with the first movable ring weight 720 is threaded. Likewise, an interface of at least one of the upper guide rod 730 and the lower guide rod 732 with the second movable ring weight 722 is threaded. By rotating at least one of the first guide rod 730 and the second guide rod 732, the first movable ring weight 720 and the second movable ring weight 722 move along the screw thread.

Figure 8:
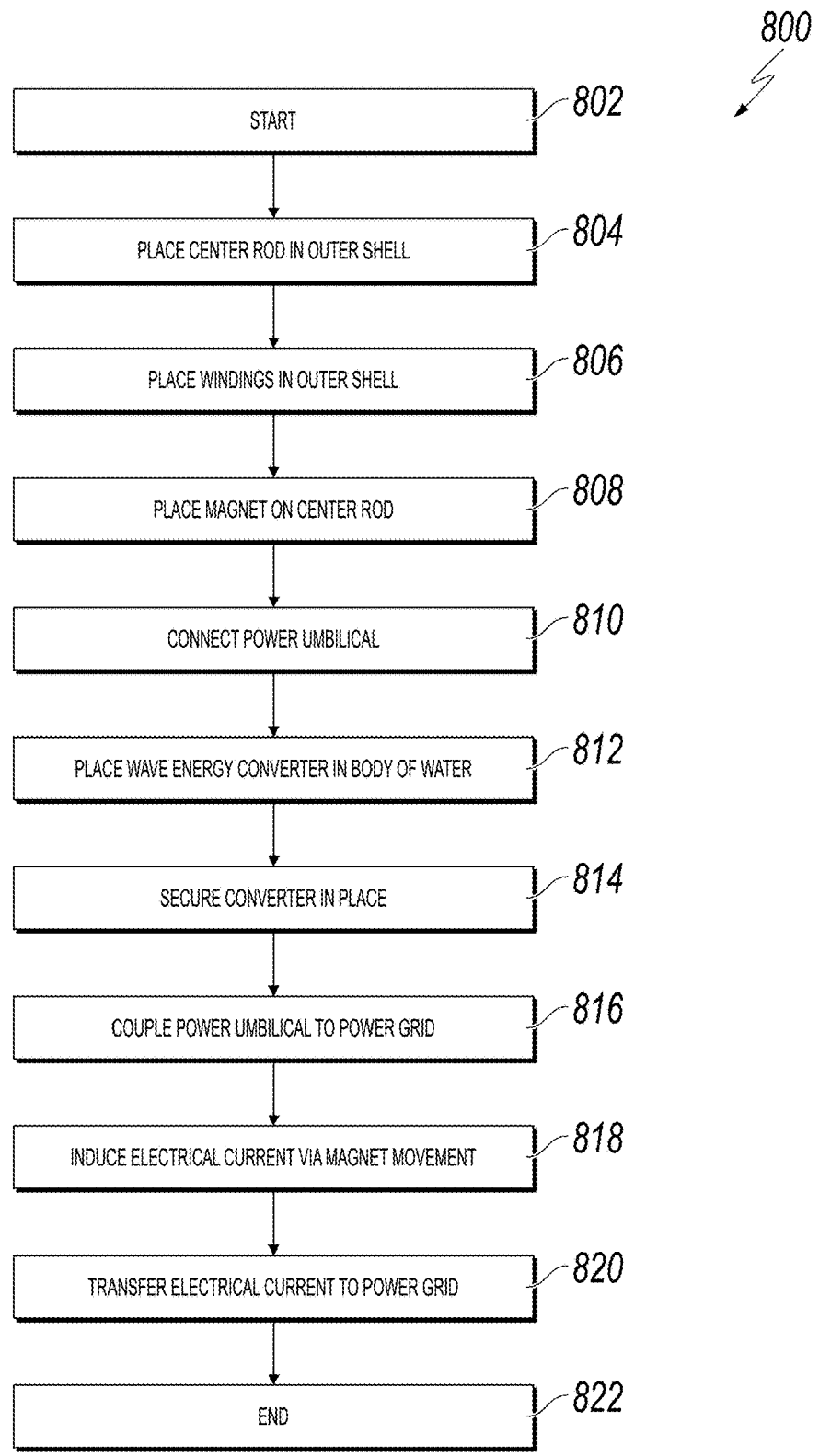
FIG. 8 is a flow diagram of a method for converting wave energy in accordance with an exemplary embodiment.

FIG. 8 is a flow diagram of a process 800 for converting wave energy. The process begins at step 802. At step 804, a center rod is disposed along a length of an outer shell. At step 806, a plurality of electrically-conductive windings are disposed around an interior circumference of the outer shell. At step 808, a magnet is slidably disposed on the center rod. At step 810, a power umbilical is electrically coupled to the plurality of electrically-conductive windings. At step 812, the outer shell, containing the center rod, the magnet, and the plurality of electrically-conductive windings, are placed in a body of water as a wave energy converter. At step 814, the wave energy converter is secured in place via, for example, mooring lines. At step 816, the power umbilical is electrically coupled to a power grid. At step 818, wave action in the body of water causes the magnet to move from along the center rod from end to end thereby inducing an electrical current in the plurality of electrically-conductive windings. At step 820, the electrical current is transferred to the power grid via the power umbilical. The process 800 ends at step 822.

Although various embodiments of the method and system of the present disclosure have been illustrated in the accompanying Drawings and described in the foregoing Specification, it will be understood that the disclosure is not limited to the embodiments disclosed, but is capable of numerous rearrangements, modifications, and substitutions without departing from the spirit and scope of the disclosure as set forth herein. It is intended that the Specification and examples be considered as illustrative only.

What is claimed is:

1. A wave energy conversion cylinder comprising:
   an outer cylinder;
   a center rod disposed along an axis of the outer cylinder;
   a bracket slidably disposed on the center rod;
   a plurality of electrically-conductive windings disposed about an inner circumference of the outer cylinder;
   a magnet slidably disposed on the center rod; and
   a buoyancy shell disposed outwardly of the outer cylinder.

2. The wave energy conversion cylinder of claim 1, comprising:
   a first moveable ring weight slidably disposed along the axis of the center rod; and
   a second moveable ring weight slidably disposed along the axis of the center rod.

3. The wave energy conversion cylinder of claim 1, wherein movement of the magnet along the center rod induces an electrical current in the plurality of electrically-conductive windings.

4. The wave energy conversion cylinder of claim 1, comprising a plurality of bearing devices that facilitate movement of the bracket.

5. The wave energy conversion cylinder of claim 4, wherein the plurality of bearing devices are ball rollers.

6. The wave energy conversion cylinder of claim 1, wherein the magnet is coupled outwardly of the bracket.

7. The wave energy conversion cylinder of claim 1, comprising an absorber block disposed at an end of the outer cylinder so as to dampen movement of the magnet.

8. The wave energy conversion cylinder of claim 1, comprising a cable box disposed at an end of the outer cylinder, the cable box being electrically coupled to the plurality of electrically-conductive windings.

9. A wave-energy conversion farm comprising;
at least one wave energy conversion device, the at least one wave energy conversion device comprising at least one wave energy conversion cylinder, the at least one wave energy conversion cylinder comprising:
an outer cylinder;
a center rod disposed along an axis of the outer cylinder;
a bracket slidably disposed on the center rod;
a plurality of electrically-conductive windings disposed about an inner circumference of the outer cylinder;
a magnet slidably disposed on the center rod;
a buoyancy shell disposed outwardly of the outer cylinder; and
an umbilical electrically coupled to the plurality of electrically-conductive windings and electrically coupled to a power grid.

10. The wave-energy conversion farm of claim 9, comprising at least one anchor coupled to the at least one wave energy conversion device.

11. The wave-energy conversion farm of claim 9, wherein the at least one wave energy conversion device comprises three wave energy conversion cylinders arranged in a triangular pattern.

12. The wave-energy conversion farm of claim 9, wherein the at least one wave energy conversion device comprises twelve wave energy conversion cylinders arranged in a hexagonal pattern.

13. A method of converting wave energy, the method comprising:
providing a wave energy conversion cylinder, the wave energy conversion cylinder comprising:
an outer cylinder;
a center rod disposed along an axis of the outer cylinder;
a bracket slidably disposed on the center rod;
a plurality of electrically-conductive windings disposed about an inner circumference of the outer cylinder;
a magnet slidably disposed on the center rod; and
a buoyancy cylinder disposed outwardly of the outer cylinder;
connecting the plurality of electrically-conductive windings to a power grid;
subjecting the wave energy conversion cylinder to wave action on a body of water; and
inducing an electrical current in the plurality of electrically-conductive windings responsive to movement of the magnet.

14. The method of claim 13, comprising connecting a plurality of wave energy conversion cylinders together to form a wave energy conversion farm.

15. The method of claim 14, comprising anchoring the wave energy conversion farm.

16. The method of claim 13, comprising adjusting at least one of a first moveable ring weight and a second moveable ring weight.

17. The method of claim 16, comprising tuning a mass moment of inertia of the wave energy conversion cylinder.

18. The method of claim 17, wherein tuning the mass moment of inertia of the wave energy conversion cylinder comprises matching a natural frequency of the wave energy conversion cylinder with an excitation frequency.

19. The method of claim 16, wherein a position of the first moveable ring weight and the second moveable ring weight are adjusted remotely.

* * * * *